G. F. LARKIN.
CONTROLLING AND LOCKING DEVICE.
APPLICATION FILED DEC. 31, 1906.

927,984.

Patented July 13, 1909.

2 SHEETS—SHEET 1.

Witnesses.

Inventor.
George Frederick Larkin
by Gowen Goepel
attorneys.

G. F. LARKIN.
CONTROLLING AND LOCKING DEVICE.
APPLICATION FILED DEC. 31, 1906.
927,984.
Patented July 13, 1909.
2 SHEETS—SHEET 2.
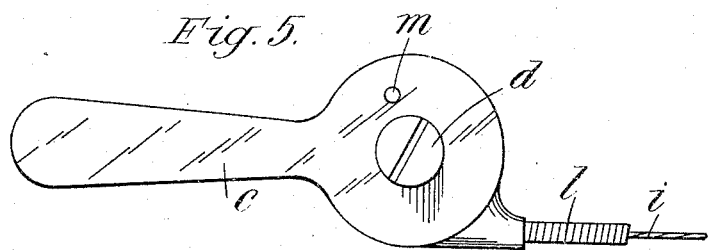
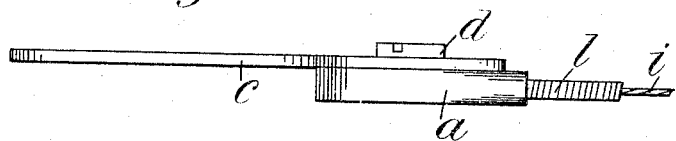
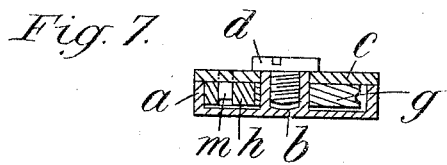
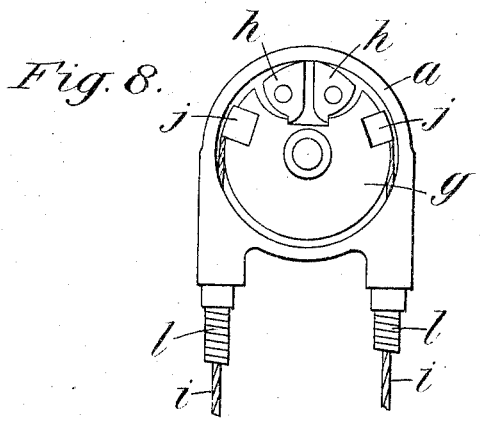
Witnesses.
Inventor
George Frederick Larkin
by
Attorneys.

UNITED STATES PATENT OFFICE.

GEORGE FREDERICK LARKIN, OF UPTON PARK, ENGLAND.

CONTROLLING AND LOCKING DEVICE.

No. 927,984.　　　　　Specification of Letters Patent.　　　Patented July 13, 1909.

Application filed December 31, 1906. Serial No. 350,303.

*To all whom it may concern:*

Be it known that I, GEORGE FREDERICK LARKIN, a subject of the King of England, residing in Upton Park, in the county of Essex and Kingdom of England, have invented certain new and useful Improvements in Controlling and Locking Devices, More Especially Applicable to Control-Levers for Motor-Cycles, Motor-Cars, and the Like, of which the following is a specification.

My invention relates to improvements in controlling and locking devices, and is more especially applicable to control levers for motor cycles, motor cars and the like, where it is desired to retain the operated part in any position to which it has been moved. It is however applicable to many other useful purposes which will be obvious. As the Bowden mechanism is particularly adapted for control levers of this kind, I will describe the invention in connection therewith but it is apparent that the device is not restricted thereto.

In order that the invention may be clearly understood, I will describe the same with the aid of the accompanying drawings, in which—

Figure 1:
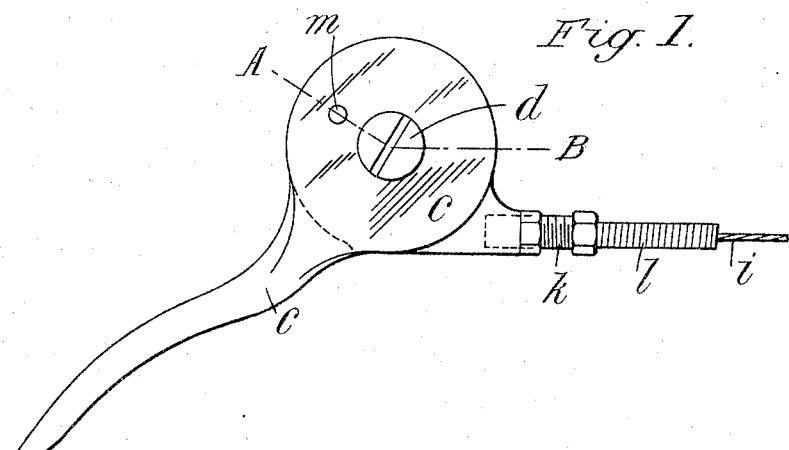
Figure 2:
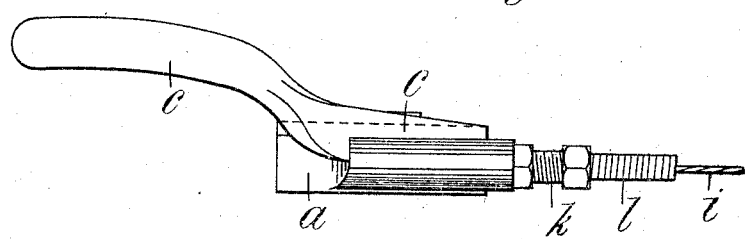
Figure 3:
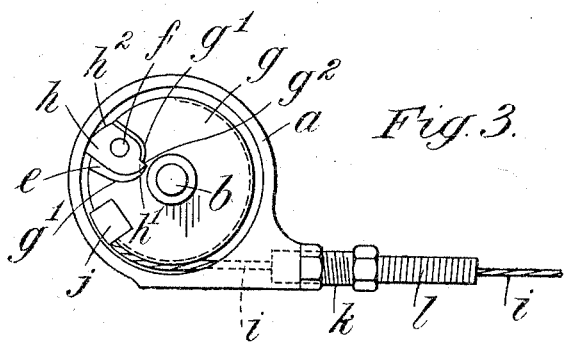
Figure 4:
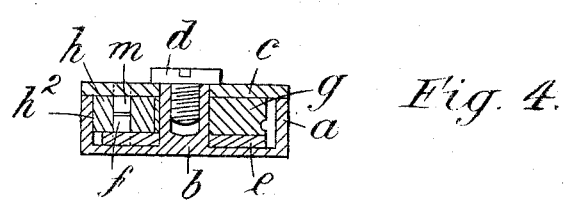

Figure 1 is a plan of one form of lever according to my invention, Fig. 2 being an edge view or elevation thereof, Fig. 3 is a plan with the lever arm and cap or cover removed, and Fig. 4 is a sectional elevation along the line A. B. of Fig. 1. Figs. 5, 6 and 7 are similar views to Figs. 1, 2 and 4 of a modified form of lever, and Fig. 8 is a plan of a double form of lever with the arm, cap or cover removed.

According to my invention and first referring to Figs. 1 to 4, I provide a fixed member or bracket $a$ which is the support for the control lever. This supporting member $a$ is hollowed out in order to form a circular box or frame and has a central stud or pin $b$ secured thereto or in one therewith adapted to act as the fulcrum of the lever $c$ which is held thereto by a screw $d$ or the like passing through the said stud $b$, such screw or bolt $b$ also holding if convenient the frame or supporting member in position upon any desired object. Upon this central stud $b$ is a disk or plate $e$ able to revolve freely thereon within the said member $a$ and upon the face of the said disk $e$ is located a stud $f$ at any convenient point between the center and periphery. Over this disk $e$ another grooved disk $g$ is provided, also revolving around the central stud $b$. Inasmuch however as the stud $f$ upon the face of the lower or inside disk $e$ projects outwardly, a suitable part of the upper grooved disk $g$ is cut away as shown at $g'$ so as to allow the disks $e$ and $g$ to lie flush with one another, and to permit the said stud $f$ to receive a cam-shaped block, wedge-shaped rocking member, pawl or eccentric $h$ which fills with a convenient amount of play, the cam-shaped cut-away part $g'$ of the grooved disk $g$. The cam-shaped block $h$ pivots or rocks upon the stud $f$ on the face of the lower disk $e$, the notched inner part $h'$ of the said block $h$ contacting with a notch $g^2$ upon the grooved disk $g$, while the outer part or surface $h^2$ of the block $h$ is curved to contact or engage with, or lie adjacent to, the inner periphery of the bracket or member $a$ within which the disks $e$ and $g$ revolve.

The grooved disk $g$ is adapted to receive the inner member $i$ of the Bowden mechanism which lies within the groove, the extremity of such member being secured to the said grooved disk in any suitable manner such as by a block $j$. Such member $i$ is led from the bracket $a$, an adjustable stop $k$ being preferably provided for the outer member $l$ of the Bowden mechanism. The cam-shaped block $h$ not only pivots upon the stud $f$ but has an opening therein to receive an internally-projecting pin $m$ of the hereinbefore mentioned arm, lever or other suitable device $c$ which pivots upon the central stud $b$ and forms the cap, or cover of the bracket $a$ to inclose the disks.

The operation of the device is as follows:—When it is desired to pull the arm or lever $c$ and actuate the object at the opposite extremity of the length of Bowden mechanism, the stud or pin $m$ on the face of the arm or lever engaging with the cam-shaped block $h$, turns the grooved disk $g$ against which it contacts, the outer periphery $h^2$ of the block $h$ being in this case free or concentric with the inner periphery of the bracket or member $a$. When the lever or arm $c$ has been turned to any desired extent and is released it remains in such position because the tendency of the grooved disk $g$ to return by reason of the pull from the operative device endeavors to move the periphery $h^2$ of the block $h$ out of concentricity with the inner periphery of the member or bracket $a$ by acting on the notch $h'$ of the block $h$ and thus converts the block $h$ into a wedge.

In the modification illustrated by Figs. 5, 6 and 7, the lower disk $e$ provided with its stud $f$ is dispensed with, the operating pin $m$ upon the arm or lever $c$ being utilized as the fulcrum for the block $h$ to oscillate upon, the operation being otherwise similar.

In the construction shown in Fig. 8, two blocks $h$ are provided, the grooved disk $g$ being cut away to give two contacting surfaces so that the arm or lever may be locked in either direction.

Although I have described the pins or studs as entering the cam-shaped block and attached to or forming part of the adjacent disk or cover, yet it will be obvious that I might form the pins upon the cam-shaped block and provide recesses to receive the same in such disk or cover without affecting the operation of the device or the principle of this invention.

What I claim and desire to secure by Letters Patent of the United States is:—

1. Controlling and locking devices comprising, in combination, an outer frame or fixed member, an inner moving disk having a cutaway portion therein, such disk being attached to the operating mechanism, an operating arm, and a wedge-shaped locking member located within such cutaway portion movable in opposite directions by said arm and adapted when the arm is actuated to present concentric and free surfaces between the fixed and moving parts but when the arm is released to form a retaining or locking wedge by reason of the pull or tendency to return of the device which is actuated.

2. Controlling and locking devices, comprising in combination an outer frame or fixed member, an operating arm, an inner moving disk, attached to the operating mechanism, a cam-shaped block pivoted to the operating arm and adapted when the device is actuated to present concentric and free surfaces between the fixed and moving parts, said cam shaped block having a shoulder contacting with said inner disk, which shoulder when the device is released is acted upon by the said disk by reason of the pull or tendency to return of the said actuated device whereby said block forms a retaining or locking wedge.

3. Controlling and locking devices, more especially for control levers for motor cycles, motor cars and the like, comprising in combination, an outer fixed member, a central pin therein, an operating arm, and a disk revolving upon the said pin, a stud upon the said disk, a cut-away grooved disk adjacent thereto, a cam-shaped block pivoting upon the said stud and also adapted to receive an internally-projecting pin of the arm or lever, whereby when the said arm is actuated the block is free but when such arm is released the said block forms a wedge.

4. Controlling and locking devices, more especially for control levers for motor cycles, motor cars and the like, comprising in combination an outer fixed member, a central pin therein, an operating arm, and a cut-away disk revolving upon the said pin, a cam-shaped block located within the said cut-away portion, a pin or stud provided upon the controlling arm or lever upon which the said block is adapted to oscillate, whereby when the said arm is actuated the block is free but when such arm is released, the said block forms a wedge.

In testimony, that I claim the foregoing as my invention, I have signed my name in presence of two subscribing witnesses.

GEORGE FREDERICK LARKIN.

Witnesses:
   J. S. WITHERS,
   E. CRESWICK.